United States Patent
Masuda

(10) Patent No.: US 7,653,293 B2
(45) Date of Patent: Jan. 26, 2010

(54) CAMERA SYSTEM WITH IMAGE STABILIZING FUNCTION, CAMERA BODY THEREOF, AND INTERCHANGEABLE LENS THEREOF

(75) Inventor: Kazunori Masuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 11/673,469

(22) Filed: Feb. 9, 2007

(65) Prior Publication Data

US 2007/0189745 A1 Aug. 16, 2007

(30) Foreign Application Priority Data

Feb. 13, 2006 (JP) ............... 2006-034967

(51) Int. Cl.
*G03B 17/00* (2006.01)
*G03B 9/08* (2006.01)

(52) U.S. Cl. .................. 396/55; 396/452; 396/529; 348/296

(58) Field of Classification Search .............. 396/55, 396/542, 457, 529; 348/296
See application file for complete search history.

(56) References Cited

U.S. PATENT DOCUMENTS

| | | | | |
|---|---|---|---|---|
| 4,110,772 A | * | 8/1978 | Nakagawa et al. | 396/456 |
| 6,035,133 A | * | 3/2000 | Shiomi | 396/55 |
| 6,147,706 A | * | 11/2000 | Inuiya et al. | 348/226.1 |
| 6,542,194 B1 | * | 4/2003 | Juen | 348/367 |
| 6,687,458 B2 | * | 2/2004 | Masuda | 396/55 |
| 2003/0007075 A1 | | 1/2003 | Masuda | |
| 2003/0007800 A1 | * | 1/2003 | Uchida et al. | 396/176 |
| 2004/0090533 A1 | * | 5/2004 | Dow et al. | 348/220.1 |
| 2006/0056830 A1 | * | 3/2006 | Tanaka et al. | 396/55 |
| 2007/0212043 A1 | * | 9/2007 | Izawa | 396/55 |
| 2008/0211922 A1 | * | 9/2008 | Murashima et al. | 348/208.99 |

FOREIGN PATENT DOCUMENTS

| | | |
|---|---|---|
| EP | 1542455 A2 | 6/2005 |
| JP | 9-043660 A | 2/1997 |

* cited by examiner

*Primary Examiner*—W. B. Perkey
*Assistant Examiner*—Dennis Hancock
(74) *Attorney, Agent, or Firm*—Canon U.S.A. Inc., I.P. Division

(57) ABSTRACT

A camera system used for shooting an image, determines whether or not a predetermined shake component due to a mechanical shutter is added to a shake component detected by a shake sensor in dependence upon the type of a shutter (a mechanical shutter or an electronic shutter), and selects the determined component accordingly.

12 Claims, 11 Drawing Sheets

CAMERA SYSTEM WITH IMAGE STABILIZING FUNCTION, CAMERA BODY THEREOF, AND INTERCHANGEABLE LENS THEREOF

BACKGROUND OF THE INVENTION

1. Field of the Invention

The present invention relates to an improvement in a camera system, and more particularly, it relates to an improvement in an image stabilization system.

2. Description of the Related Art

Cameras have been generally automated in significant operations for shooting images such as exposure setting and focusing. Therefore, even a user inexperienced at operating a camera can achieve good results. In recent years, image stabilization systems have also been widely employed for reducing image blur due to camera shake. Such an image stabilization system of a camera will be briefly described below.

Camera shake during shooting is vibration normally having a frequency of 1 to 12 Hz. The image blur caused by this camera shake is reduced by detecting a shake amount of the camera due to the camera shake, and shifting a correcting lens corresponding to the detected shake amount.

To effectively reduce the image blur due to camera shake, it is necessary to (1) accurately detect the vibration of the camera, and (2) accurately correct a displacement of the light axis due to the vibration. The shake amount of the camera is detected by using angular displacement signals obtained upon integration of signals output from shake sensors that detect an angular acceleration, an angular speed, and the like. A correction optical unit is driven to decenter the shooting light axis on the basis of the accurately detected signals, thereby effectively preventing the image blur.

FIG. 10 shows an example of a camera system provided with an image stabilizer (including an image stabilization optical system and shake sensors) in an interchangeable lens.

A CPU 701 embedded in a camera body 700 and a CPU 703 embedded in an interchangeable lens 702 are connected to each other via a serial bus line with a contact block 704 interposed therebetween.

Actuators (for an aperture, a focusing lens, and the like) provided in the interchangeable lens 702 are driven in response to instruction signals transferred through the bus line from the camera body 700.

The interchangeable lens 702 is provided with shake sensors 705 and 706 for detecting shake around predetermined P and Y axes in the interchangeable lens 702. Outputs from the shake sensors 705 and 706 are converted into outputs having predetermined levels. On the basis of the converted outputs, the image stabilization optical system 707 is driven for image stabilization with respect to the P and Y axes Circuits 708 and 709 drive the image stabilization optical system 707. A mirror 710 which jumps up in exposure, and a shutter mechanism 711 which determines a shutter speed, are provided in the camera body 700.

FIG. 11 is an explanatory view showing shake waveforms accompanying drive of a focal plane shutter which is used in a normal single-lens reflex camera.

As shown in part (a) of FIG. 11, drive of a shutter front curtain is started. At this time, the camera moves inversely to the movement direction of the shutter front curtain due to the principal of action and reaction. As shown in part (b) of FIG. 11, the downward shake appears.

When a time t has elapsed since the drive of the shutter front curtain was started, the drive of the front curtain is completed, and the movement of the shutter curtain is stopped. Since the camera moves inversely due to reaction, the upward shake appears as shown in part (b) of FIG. 11. Normally, the driving time of the shutter curtain takes several microseconds, and thus the shake due to the drive of the shutter curtain has a frequency of several tens to several hundreds of hertzs.

The shake sensor used for detecting the camera shake is generally difficult to accurately detect a frequency around 100 Hz due to its performance. Owing to this, as indicated by the solid line shown in part (c) of FIG. 11, the peak of the sensor output is displayed by a time ts with respect to the peak of the actual shake waveform.

A correction band of a correction system holds several tens of hertzs to 100 Hz. As a result, as indicated by the dotted line shown in part (c) of FIG. 11, the peak of the output of the correction system is displayed by a time tc with respect to the peak of the sensor output when the sensor output and the shake signal around 100 Hz are compared.

As mentioned above, the actual correction operation is seriously delayed as compared with the shake signal around 100 Hz (ts and tc). Therefore, as shown in part (d) of FIG. 11, the shake waveform on an actual image plane causes increase in image blur due to the delayed correction operation.

To solve the above problem, Japanese Patent Laid-Open No. 9-43660 discloses a configuration in which correction data like a linear function as shown in part (e) of FIG. 11 is added to the output of the shake sensor (see part (f) of FIG. 11), and the image stabilization is performed by using the data.

With this solution, the correction error is reduced as shown in part (g) of FIG. 11. Accordingly, the shake component due to the drive of the shutter front curtain may be substantially corrected.

The above-described publication is designated for the drive of a focal plane mechanical shutter which is used in a normal single-lens reflex camera.

In recent years, digital single-lens reflex cameras have been widely used. There may be a digital single-lens reflex camera that has an electronic shutter function for controlling an exposure time by electrically controlling a light accumulation time to an image pickup device, but does not have a focal plane shutter.

In addition, there may be a camera that has both the electronic shutter and the focal plane shutter, and selects either one of the two types of shutters depending upon a shooting mode or the like. If the technique of adding the shake component due to the focal plane shutter is applied to the digital camera capable of shooting an image only with the electronic shutter, unwanted correction is performed even though there is no shake component due to the focal plane shutter. This may cause the increase in image blur of a captured image.

SUMMARY OF THE INVENTION

The present invention provides a camera body, an interchangeable lens, and a camera system. The camera system is capable of providing an image with less blurring even if a camera body having different types of shutters is combined with the interchangeable lens.

The camera system is used for capturing an image, determines whether or not a predetermined shake component due to a mechanical shutter is added to a shake component detected by a shake sensor depending on the type of a shutter (a mechanical shutter or an electronic shutter), and selects the determined component. Alternatively, the camera system determines data to be added depending on the type of the shutter, and selects the determined data.

With the above-described configuration, a camera system may be provided in which the camera body prevents erroneous correction due to the shake component of either the mechanical shutter or the electronic shutter, and the image blur is effectively corrected.

According to an aspect of the present invention, a camera system is provided including a camera body having a shutter, and an interchangeable lens detachably attached to the camera body and adapted to communicate with the camera body. The camera system further includes an image pickup switch configured to give an instruction to start picking up an image; a shake detector configured to detect a shake component of the camera system; a correction unit configured to correct image blur due to the shake component; a storage unit configured to correct data relating to an operation of the shutter; and a calculation unit configured to calculate a shake amount on the basis of the shake component detected by the shake detector and the correction data stored in the storage unit corresponding to an operation of the image pickup switch, wherein the calculation unit modifies the correction data stored in the storage unit for the calculation of the shake amount depending on a type of the shutter.

According to another aspect of the present invention, the shutter is one of a focal plane shutter and an electronic shutter. Furthermore, according to another aspect of the present invention, the shutter may be selectively used.

According to another aspect of the present invention, the shutter is one of a focal plane shutter and an electronic shutter, and at image pickup, a front curtain operation is performed by the electronic shutter while only a rear curtain of the focal shutter is operated.

According to yet another aspect of the present invention, the storage unit is provided in the interchangeable lens, and the correction data is selected from the storage unit in accordance with information related to the shutter transmitted from the camera body.

According to another aspect of the present system, the storage unit is provided in the camera body, and the camera body is configured to transmit information stored in the storage unit to the interchangeable lens.

Furthermore, according to another aspect of the present invention, none of the correction data is used or it is assumed to be 0 when the type of the shutter is electronic shutter.

Additionally, according to yet another aspect of the present invention, a camera body to which a lens unit can be interchangeably attached is provided, the lens unit having a shake detector configured to detect a shake component, a correction unit configured to correct image blur due to the shake component, and a calculation unit configured to calculate a shake amount on the basis of the shake component detected by the shake detector. The camera body includes an image pickup device configured to pick up an image to be picked up; a shutter unit configured to determine the exposure time of the image to be picked up; an image pickup switch configured to give an instruction to start picking up the image; and a storage unit configured to store data relating to the type of the shutter to be used; a communication unit, wherein the communication unit sends the lens unit the data stored in the storage unit to calculate a shake amount by the calculation unit in the lens unit, in response to an operation of the image pickup switch.

Moreover, according to yet another aspect of the present invention, a lens unit which is interchangeably attachable to a camera body is provided, the camera body having an image pickup device, a shutter unit, an image pickup switch configured to give an instruction to start picking up the image, a storage unit configured to store data relating to the type of the shutter to be used. The lens unit includes a shake detector configured to detect a shake component; a correction unit configured to correct image blur due to the shake component; a calculation unit configured to calculate a shake amount on the basis of the shake component detected by the shake detector; and a communication unit, wherein the communication unit receives the data stored in the storage unit in response to an operation of the image pickup switch and the received data is used to calculate a shake amount by the calculation unit.

Further features and aspects of the present invention will become apparent from the following description of exemplary embodiments with reference to the attached drawings.

DESCRIPTION OF THE EMBODIMENTS

Exemplary embodiments of the present invention will now herein be described with reference to the drawings.

First Exemplary Embodiment

Figure 1:
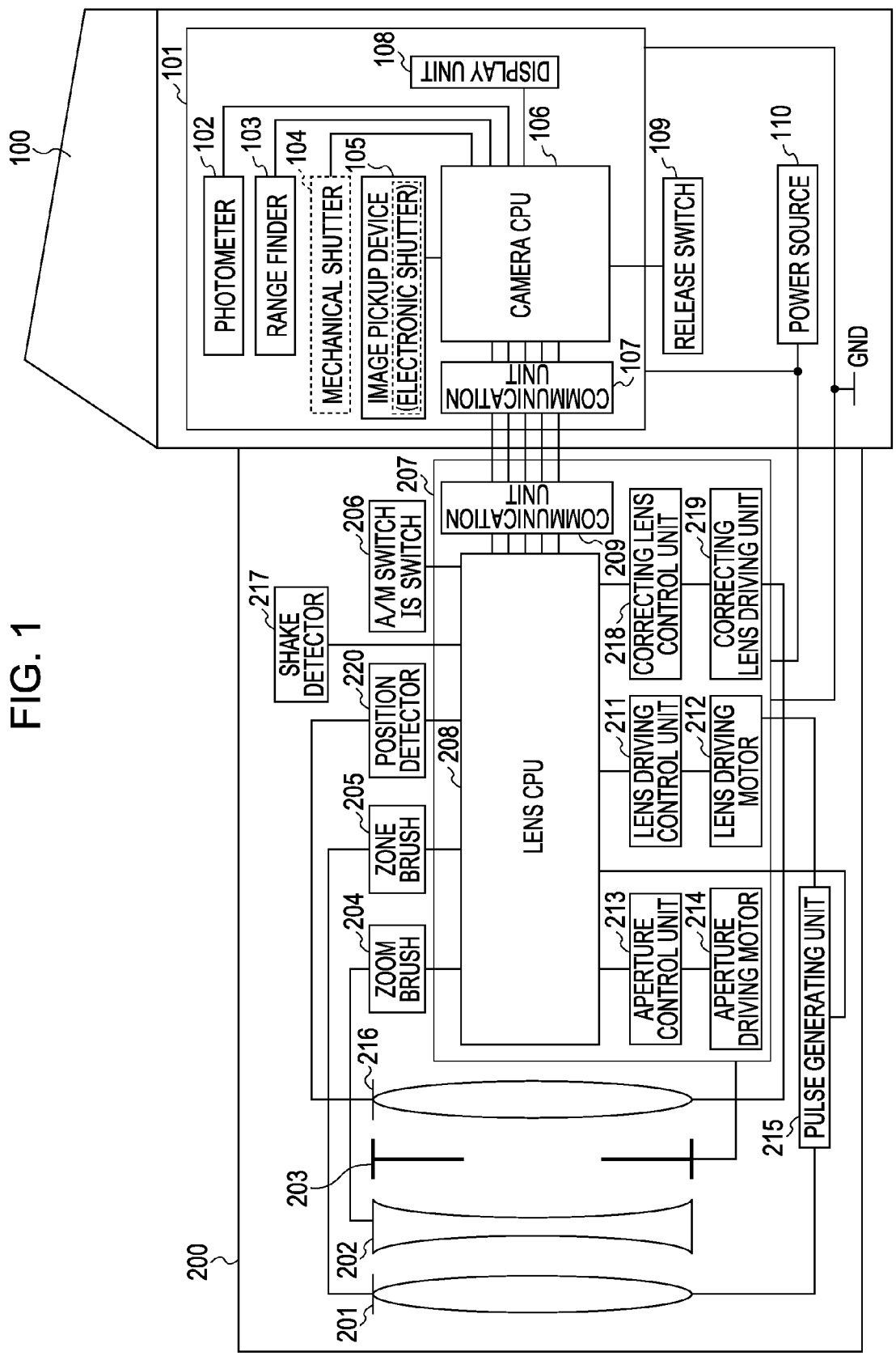
FIG. 1 is a block diagram showing an example configuration of a single-lens reflex camera system according to a first embodiment of the present invention.

FIG. 1 is a block diagram showing a first embodiment. A camera body 100 is for a digital single-lens reflex camera. An interchangeable lens 200 is attached to the camera body 100. An electric circuit 101 is disposed in the camera body 100. The electric circuit 101 includes a photometer 102, a range finder 103, and a focal plane mechanical shutter 104 for controlling an exposure time of an image pickup device 105 (for instance, a CCD or CMOS sensor, the image pickup device 105 has an electronic shutter function, and in such a case, the focal plane mechanical shutter 104 may not be provided). A camera CPU 106 controls the camera system. A communication unit 107 enables serial communication with the interchangeable lens 200. A display unit 108 displays various information relating to the camera. A two-stroke release switch 109 is provided in the camera body 100. A switch SW1 is turned ON at a first stroke, and a release switch SW2 is turned ON at a second stroke. A power source 110 supplies power to the camera body 100 and the interchangeable lens 200.

The interchangeable lens 200 includes a focusing lens 201, a zooming lens 202, an aperture 203 and a correcting lens 216 for image stabilization. A zooming position detecting brush 204 detects a position of the zooming lens 202. A focusing position detecting brush 205 detects a position of the focusing lens 201. An A/M and IS switch unit 206 includes an A/M switch for selecting automatic focusing or manual focusing, and an IS switch for selecting the image stabilization to be ON or OFF. A position detector 220 detects a position of the correcting lens 216. A shake detector 217 detects shake of the interchangeable lens 200.

An electric circuit 207 is disposed in the interchangeable lens 200. The electric circuit 207 includes a lens CPU 208 for controlling the functions of the interchangeable lens 200, and a communication unit 209 for enabling serial communication with the camera body 100.

A lens driving control unit 211 controls drive of the focusing lens 201. A lens driving motor 212 drives the focusing lens 201. An aperture control unit 213 controls drive of the aperture 203. An aperture driving motor 214 drives the aperture 203. A pulse generating unit 215 outputs a pulse signal according to the movement of the focusing lens 201.

A correcting lens control unit 218 controls the drive to the correcting lens 216. A correcting lens driving unit 219 (such as a DC motor, a stepping motor or a voice coil motor) drives the correcting lens 216.

Figure 2:
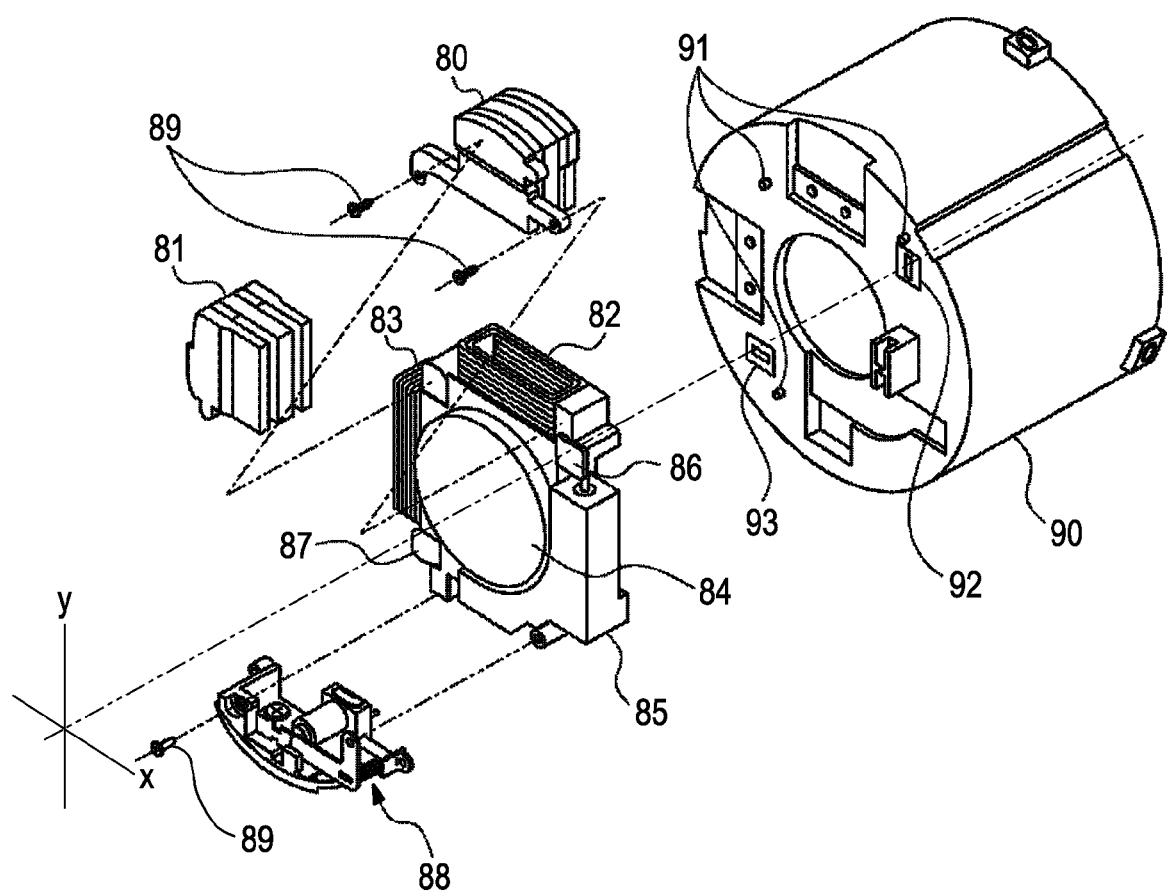
FIG. 2 is a perspective view showing an example configuration of an image stabilization optical system (including a correcting lens 216, a position detector 220 and a correcting lens driving unit 219) shown in FIG. 1.

Next, the image stabilization optical system (including the correcting lens 216, the position detector 220 and the correcting lens driving unit 219) will be described below with reference to FIG. 2.

The image stabilization optical system is a shift optical system for decentering a light path entering a camera photographic optical system by parallel-shifting a lens in the x and y axis directions orthogonal to the light axis of the lens.

Yokes 80 and 81 are magnetic circuit units function as driving sources in the x and y axis directions. Coils 82 and 83 respectively make pairs with the yokes 80 and 81.

A shake correcting lens 84 is driven in the x and y axis directions when power is supplied to the coils 82 and 83 from the correcting lens control unit 218. A support frame and support arm unit 85 retains the shake correcting lens 84.

Infra-red light emitting diodes (iREDs) 86 and 87 move along with the shake correcting lens 84. Position detectors (PSDs) 92 and 93 are mounted on a lens barrel 90. The iREDs 86 and 87 and the PSDs 92 and 93 detect the movement of the shake correcting lens 84 in a non-contact manner.

The lens CPU 208 acquires detected signals output from the PSDs 92 and 93. The lens CPU 208 performs feedback operation and control so that the output from the shake detector 217, such as a vibrating gyroscope, and the position output of the correcting lens 216 have a certain relationship.

The result of the feedback operation and control are applied to the coils 82 and 83 through the correcting lens control unit 218. Accordingly, the shake correcting lens 84 is driven to correct image blur.

A mechanical lock 88 retains the shake correcting lens 84 such that the shake correcting lens 84 is substantially located at the center of the light axis when the power application to the shift system is stopped. Also the mechanical lock 88 inhibits the movement of the shake correcting lens 84 under suspension of the image stabilizing function. The lock position can be located at the center of the light axis in view of optical performance. Reference numerals 89 denote charge pins. Support spheres 91 restrict the shift system from tilting forward and backward.

Figure 3:
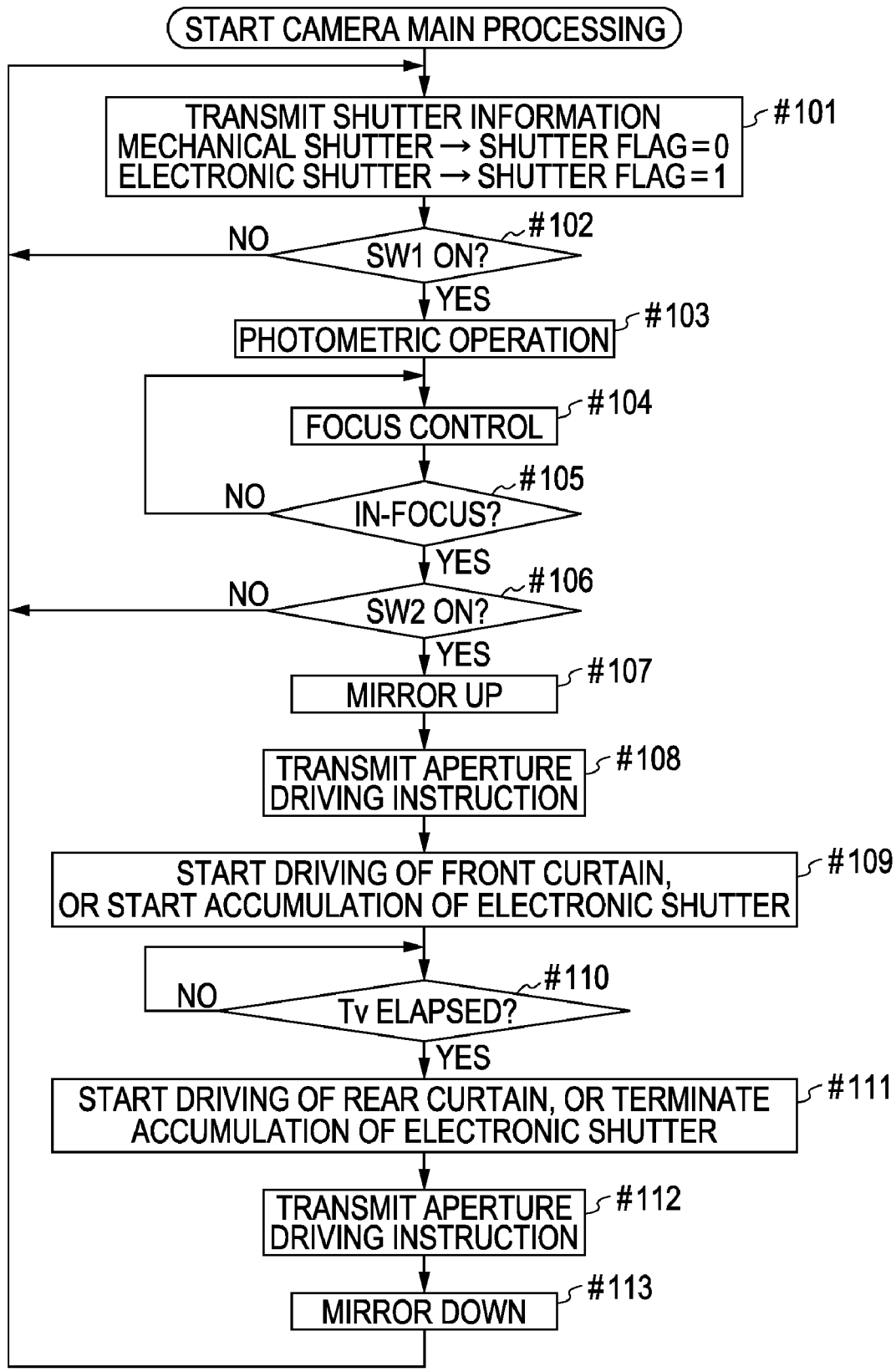
FIG. 3 is a flowchart showing an exemplary main operation of a camera CPU shown in FIG. 1.

Next, the operation of the camera CPU 106 will be described below with reference to a flowchart shown in FIG. 3. In step #101, the camera body 100 transmits information of a shutter type to be actuated when image pickup is started, to the lens CPU 208.

For example, the information indicates SHUTTER FLAG=0 in a case of a camera with the mechanical shutter 104 actuated, whereas the information indicates SHUTTER FLAG=1 in a case of a camera with the electronic shutter actuated.

Then, in step #102, the operation waits for the switch SW1 to be turned ON. If it is detected that the switch SW1 is turned ON, the operation proceeds to step #103, in which a photometric operation is performed. Then, in step #104, focusing control is performed. With the focusing control, a subject image is detected by an optical sensor (not shown) of the range finder 103, and a defocusing amount is calculated. Then a focusing lens driving instruction is calculated on the basis of the defocusing amount, and the instruction is transmitted to the interchangeable lens 200 (more particularly, to the lens CPU 208).

In step #105, it is determined whether an in-focus state is accomplished. If NO, the operation returns to the step #104, in which the focusing control is performed again.

If the in-focus state is determined in the step #105, the operation proceeds to step #106. Here, it is determined whether the switch SW2 is turned ON. If the switch SW2 is turned ON, the operation proceeds to step #107, in which a mirror up operation is performed for shooting an image.

Then, in step #108, an aperture driving instruction is transmitted to the interchangeable lens 200. In step #109, a shutter front curtain is driven and exposure is started in the case of the camera with the mechanical shutter 104 actuated. Or in the case of the camera with the electronic shutter actuated, the exposure is started when accumulation is started by the electronic shutter.

Then, the operation proceeds to step #110, and waits for that a predetermined shutter time Tv elapses. When the shutter time Tv has elapsed, the operation proceeds to step #111.

In the case of the camera with the mechanical shutter 104 actuated, a shutter rear curtain is driven to terminate the exposure.

Or in the case of the camera with the electronic shutter actuated, the exposure is terminated when the accumulation is terminated by the electronic shutter.

Then, in step #112, an aperture release instruction is transmitted to the interchangeable lens 200. In step #113, a mirror down operation is performed, and the operation returns to the step #101.

In the mirror down operation, the camera CPU 106 also transmits the conditions of the switches SW1 and SW2 to the interchangeable lens 200. In addition, the camera CPU 106 acquires a lens ID for identifying the attached interchangeable lens 200, and other information through the communication with the interchangeable lens 200.

Next, the operation of the lens CPU 208 will be described below with reference to a flowchart shown in FIG. 4.

When the interchangeable lens 200 is attached to the camera body 100, serial communication is started from the camera CPU 106 to the lens CPU 208. The lens CPU 208 starts its operation from step #201. In the step #201, various settings are initialized. For example, a variable and a flag are initialized, various ports are set, various interference controls are set, and data is read from a nonvolatile memory.

Note that this step is performed only when a lens microcomputer is reset, and it would not be performed otherwise.

Then, in step #202, the conditions of the A/M switch and IS switch are detected, and the positions of the zooming lens 202 and the focusing lens 201 are detected. In step #203, a focusing lens driving control is performed in response to a focusing lens driving instruction transmitted from the camera CPU 106. In step #204, an aperture driving control is performed in response to an aperture driving instruction transmitted from the camera CPU 106.

Then, in step #205, it is determined whether a stop instruction for the entire drive (to stop the entire drive of the actuators disposed in the interchangeable lens 200) has been received from the camera CPU 106.

If the stop instruction for the entire drive has been received, the operation proceeds to step #206. If it has not been received, the operation returns to the step #202. The stop instruction for the entire drive is transmitted from the camera CPU 106 when the camera body 100 is not operated for a predetermined time.

In the step #206, a stop control for the entire drive is performed when the stop instruction for the entire drive has been transmitted. Then, the entire drive of the actuators are stopped, the lens CPU 208 enters a sleep (stopped) mode, and the power application to a lens electric system is also stopped.

Thereafter, if a switch or the like is operated at the camera body 100, the camera CPU 106 transmits a signal indicating that the camera body 100 has been operated, to the lens CPU 208. The lens CPU 208 releases the sleep mode, and the operation is again started from the step #202.

During the procedures, if interruption using the serial communication is requested through the communication from the camera CPU 106, the interruption processing is performed.

The lens CPU 208 decodes transmitted communication data, and performs lens control corresponding to the result of decoding. Then, on account of the result of decoding of the communication data, information is identified such as the switch SW1 being turned ON, the switch SW2 being turned ON, a shutter time, a camera type, and shutter information.

In addition, an image stabilizing operation is also performed by the interruption processing which periodically occurs. In the image stabilizing operation, a control in a first direction (pitch direction) and that in a second direction (yaw direction) are alternately performed. This operation will be described with reference to a flowchart shown in FIG. 5.

Figure 5:
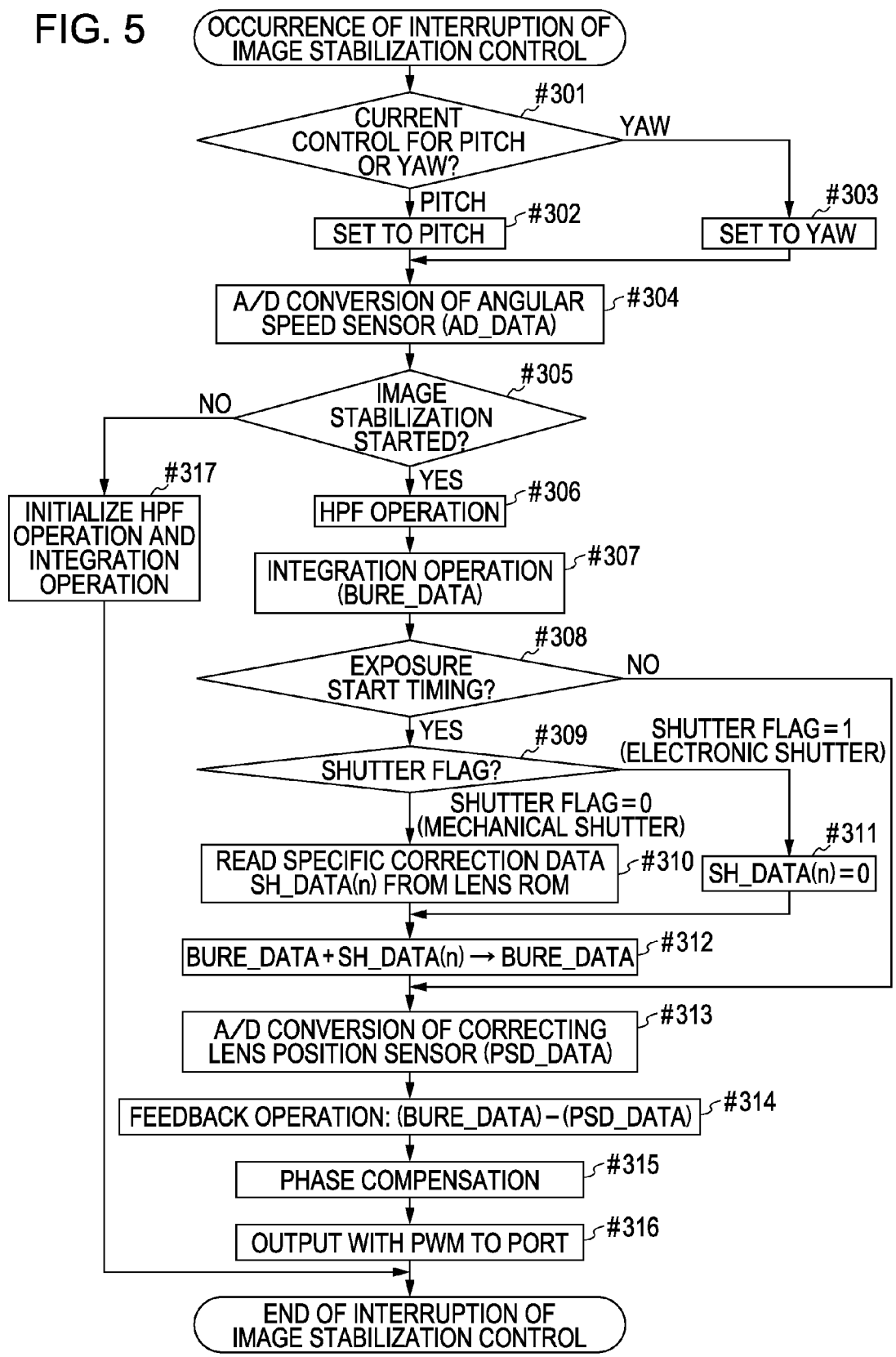
FIG. 5 is a flowchart showing an exemplary interruption operation of image stabilization of the camera CPU shown in FIG. 1.

When the interruption of the image stabilization occurs, the lens CPU 208 starts the operation from step #301 shown in FIG. 5.

In the step #301, it is determined whether the control direction is the pitch direction or the yaw direction. If the pitch direction is selected, the operation proceeds to step #302, in which a data address is set so that various flags, coefficients, calculation results are readable and writable as pitch data.

Alternatively, if the yaw direction is selected, the operation proceeds to step #303, in which a data address is set so that various flags, coefficients, calculation results are readable and writable as yaw data.

In step #304, the output from the shake detector 217 is A/D converted and the result is stored in AD_DATA previously defined in a RAM.

In step #305, it is determined whether the instruction to start the image stabilization is given. When the decoding result of the communication transmitted from the camera CPU 106 indicates that the IS switch and the switch SW1 are both turned ON, it is determined to start the image stabilization.

If the decoding result indicates the start instruction of the image stabilization, the operation proceeds to step #306, and if the result does not indicate the start instruction, the operation proceeds to step #316. In this case, it is assumed that the start instruction of the image stabilization is given, and the operation proceeds to the step #306. In the step #306, a high pass filter (HPF) operation is applied to a shake signal to eliminate a low frequency component.

In step #307, an integration operation is applied to the HPF-operated signal. As a result, an angular displacement signal (BURE_DATA) due to camera shake may be obtained.

In step #308, it is determined whether the current state meets an exposure start timing. If NO, the operation proceeds to step #313, and if YES, the operation proceeds to step #309.

The exposure start timing means a timing to start driving a front curtain in the case of the camera with the mechanical shutter 104 actuated. In the case of the camera with the electronic shutter actuated, the exposure start timing means a timing to start accumulation to the image pickup device 105.

In the step #309, shutter information (SHUTTER FLAG) transmitted from the camera CPU 106 is determined.

If SHUTTER FLAG=0, it is determined that the camera is the one with the mechanical shutter 104 actuated, thereby proceeding to step #310. Then, an operation for correcting a shake component due to the drive of the shutter front curtain is performed.

On the other hand, if SHUTTER FLAG=1, it is determined that the camera is the one with the electronic shutter actuated, then proceeding to step #311.

To correct the shake due to the drive of the shutter front curtain, in the step #310, optional waveform data (specific correction data, SH_DATA(n)) is read, the data previously stored in a ROM (not shown) in the lens CPU 208.

The optional waveform data (SH_DATA(n)) is waveform data due to vibration caused by shutter release, and corresponds to the identified type of the camera body 100, namely, the data is a shake signal due to an impact of the drive of the front curtain driven by the mechanical shutter 104. Also, the optional waveform data (SH_DATA(n)) is data variable with time from the timing of driving the shutter front curtain (n=0).

On the other hand, when the operation proceeds to the step #311, the mechanical shutter 104 would not be actuated in the camera with the electronic shutter actuated, the above-mentioned SH_DATA(n) is determined to 0.

Then, in step #312, the optional waveform data (SH_DATA(n)) obtained in the step #310 or that in the step #311 is added to the angular displacement data (BURE_DATA) obtained in the step #307 (i.e., BURE_DATA+SH_DATA(n)→BURE_DATA), to update the angular displacement data.

In a case where the shutter driving direction is inversed, the optional waveform data (SH_DATA(n)) may be subtracted.

If it is determined in the step #309 that the camera is the one with the electronic shutter actuated, the optional waveform data (SH_DATA(n)) is determined to SH_DATA(n)=0. This is equivalent to the operation for correcting the shake due to the drive of the shutter front curtain not being performed.

In step #313, the output from the position detector 220 (PSDs 92 and 93) for detecting the position of the correcting lens 216 is acquired and A/D converted (the converted result=PSD_DATA). In step #314, a feedback operation {(BURE_DATA)−(PSD_DATA)} is performed. In step #315, a phase compensation operation is performed to realize a stable control system. Then, in step #316, the operation result obtained in the step #314 is output to an output port (not shown).

A signal output from the output port is input to the correcting lens control unit 218, so that the correcting lens 216 is driven by the correcting lens driving motor 219 to perform the image stabilization. The interruption processing of the image stabilization is completed.

If the instruction to start the image stabilization is not given in the step #305, the operation proceeds to the step #317 as mentioned above.

Then, the high pass filter (HPF) operation and the integration operation are initialized, and the interruption processing of the image stabilization is completed.

As described above, the camera body 100 transmits the information on the shutter to the interchangeable lens 200 when the image pickup is started.

The interchangeable lens 200 modifies the specific correction data when the operation for correcting the shake due to the drive of the shutter front curtain is performed, in accordance with the information on the shutter received from the camera body 100 (the steps #309 to #311 in FIG. 5).

In particular, in the case of the camera with the electronic shutter actuated, the specific correction data is determined to be 0.

Accordingly, in the case of the camera with the electronic shutter actuated, the operation for correcting the shake due to the drive of the shutter front curtain would not be substantially performed. Therefore, any increase in image blur due to erroneous correction may be prevented.

Second Exemplary Embodiment

In a second embodiment of the present invention, both the mechanical shutter 104 and the electronic shutter are provided. The shutter mechanism is selected according to a shooting mode.

Described below is the combination of the camera body 100 and the interchangeable lens 200 in which correction data is selected for correcting the shake due to the drive of the shutter front curtain in the interchangeable lens 200.

Figure 6:
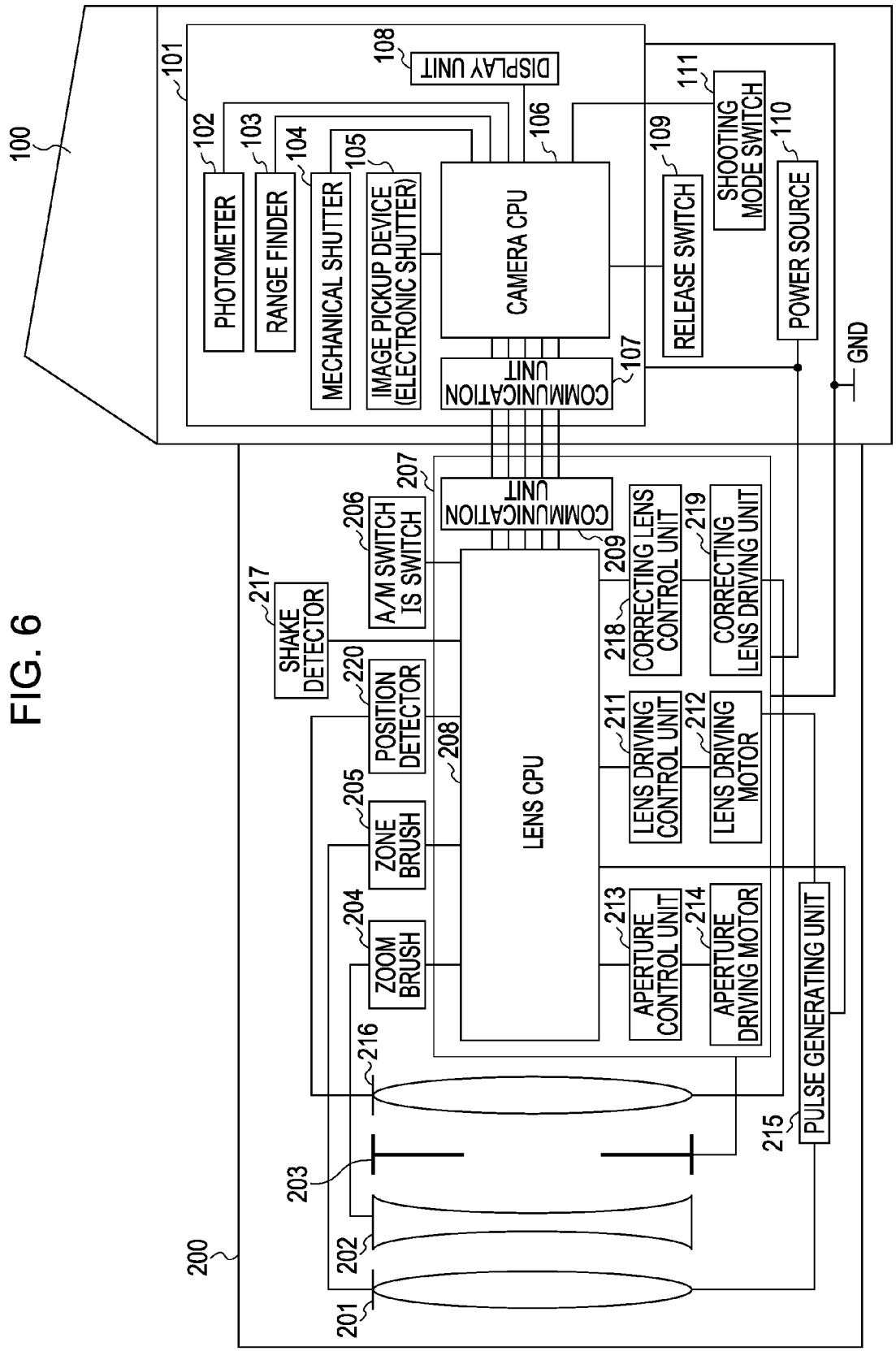
FIG. 6 is a block diagram showing an example configuration of a single-lens reflex camera system according to a second embodiment of the present invention.

FIG. 6 is a block diagram according to the second embodiment. The second embodiment is different from the first embodiment in that the camera body 100 has both the focal plane mechanical shutter 104 and the electronic shutter with the image pickup device 105.

In addition, a shooting mode switch 111 for selecting a shooting mode is provided. For example, the mechanical shutter 104 is used in shooting mode 1, and the electronic shutter is used in shooting mode 2. In shooting mode 1, a normal still image is picked up by driving the shutter front curtain and rear curtain. In shooting mode 2, an image to be picked up may be displayed on a liquid crystal monitor (not shown), and a still image is picked up by using the electronic shutter at the displayed state.

Figure 4:
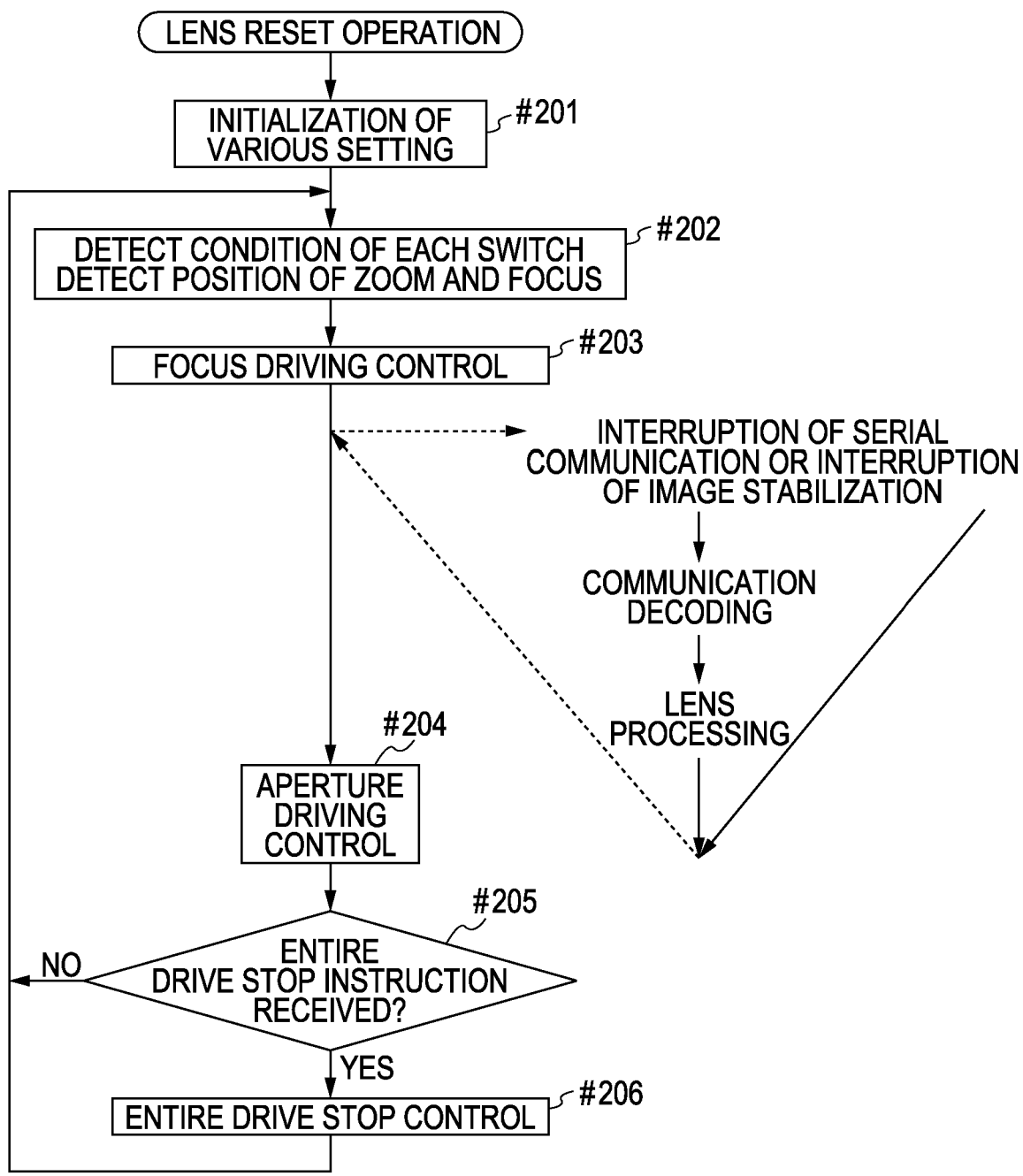
FIG. 4 is a flowchart showing an exemplary main operation of a lens CPU shown in FIG. 1.

The main operation and the interruption operation of the image stabilization by the lens CPU 208 are the same as that shown in the flowcharts of FIGS. 4 and 5, and hence, the description will be omitted.

Figure 7:
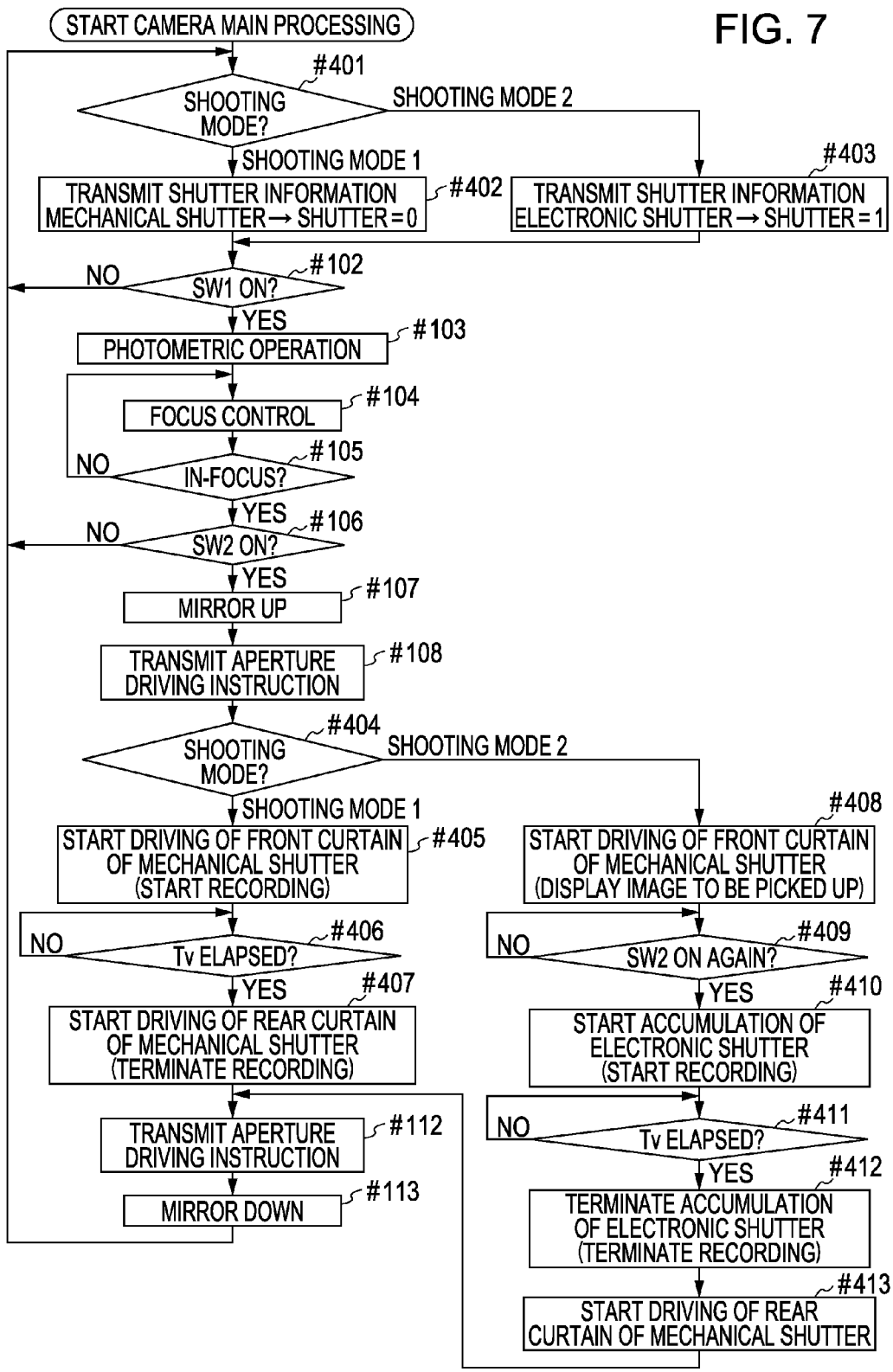
FIG. 7 is a flowchart showing an exemplary main operation of a camera CPU shown in FIG. 6.

The main operation by the camera CPU 106 different from that described in the first embodiment will be described below with reference to a flowchart shown in FIG. 7. Note that only steps #401 to #413 shown in FIG. 7 are described since these steps are applicable to the second embodiment of the present invention. Since other operations are the similar as that shown in FIG. 3, the same numbers are applied to such steps, and the description thereof will be omitted. In step #401, the shooting mode is determined. If the shooting mode is the above-described shooting mode 1, the operation proceeds to step #402, in which shutter information indicating SHUTTER FLAG=0 (mechanical shutter 104) is transmitted to the interchangeable lens 200.

Alternatively, if the shooting mode is the above-described shooting mode 2, the operation proceeds to step #403, in which shutter information indicating SHUTTER FLAG=1 (electronic shutter) is transmitted to the interchangeable lens 200.

Then, in step #404, the shooting mode is determined again. If shooting mode 1 is selected, the shutter front curtain is driven in step #405 (start of recording). Next, the operation proceeds to step #406, and waits until a predetermined shutter time Tv elapses. When the shutter time Tv has elapsed, the operation proceeds to step #407, in which the shutter rear curtain is driven (termination of recording).

On the other hand, if shooting mode 2 is selected, the shutter front curtain is driven in step #408. At this time, the recording is not started, and an image to be picked up is merely displayed on the liquid crystal monitor or the like (not shown).

In step #409, it is determined again whether the switch SW2 is turned ON. If the switch SW2 is not turned ON, the operation waits to be turned ON. If the switch SW2 is turned ON, accumulation by the electronic shutter is started in step #410, and the recording is started. In step #411, the operation waits until a predetermined shutter time Tv elapses. When the shutter time Tv has elapsed, the operation proceeds to step #412, in which the accumulation by the electronic shutter is terminated and thus the recording is terminated. Then, the shutter rear curtain is driven in step #413.

As described above, the camera body 100 transmits information on the shutter to be used when the image pickup is started corresponding to the shooting mode, to the interchangeable lens 200.

In addition, similarly to the first embodiment, the interchangeable lens 200 modifies the specific correction data for the operation on account of the vibration of the shutter, in accordance with the information on the shutter to be used when image capture is started, the information being transmitted from the camera body 100 (the steps #309 to #311 in FIG. 5).

Accordingly, even when the camera has both a mechanical shutter 104 and an electronic shutter and either one is selected depending on the shooting mode, the operation for correcting the shake due to the drive of the shutter front curtain would not be performed in the case of the electronic shutter mode, whereby erroneous correction is not performed. Therefore, any increase in image blur may be prevented.

Third Exemplary Embodiment

In a third embodiment of the present invention, the combination of the camera body 100 and the interchangeable lens 200 will be described in which both a mechanical shutter 104 and an electronic shutter are provided, and either one is selected depending on the shooting mode. In this example, a camera ROM has specific correction data for correcting the shake caused by the drive of the shutter front curtain in the interchangeable lens 200. In this case, the shutter information would not be transmitted from the camera body 100.

Instead of this, the specific correction data for correcting the shake due to the drive of the shutter front curtain is transmitted to the interchangeable lens 200 corresponding to the shooting mode. A block diagram according to the third embodiment is similar to that shown in FIG. 6. The example of the shooting mode is also similar to that described in the second embodiment.

In addition, the main operation performed by the lens CPU 208 is the similar as that shown in the flowchart of FIG. 4, and hence the description will be omitted.

However, the main operation by the camera CPU 106 different from that described in the first and second embodiments will be described below with reference to the flowchart shown in FIG. 8.

Figure 8:
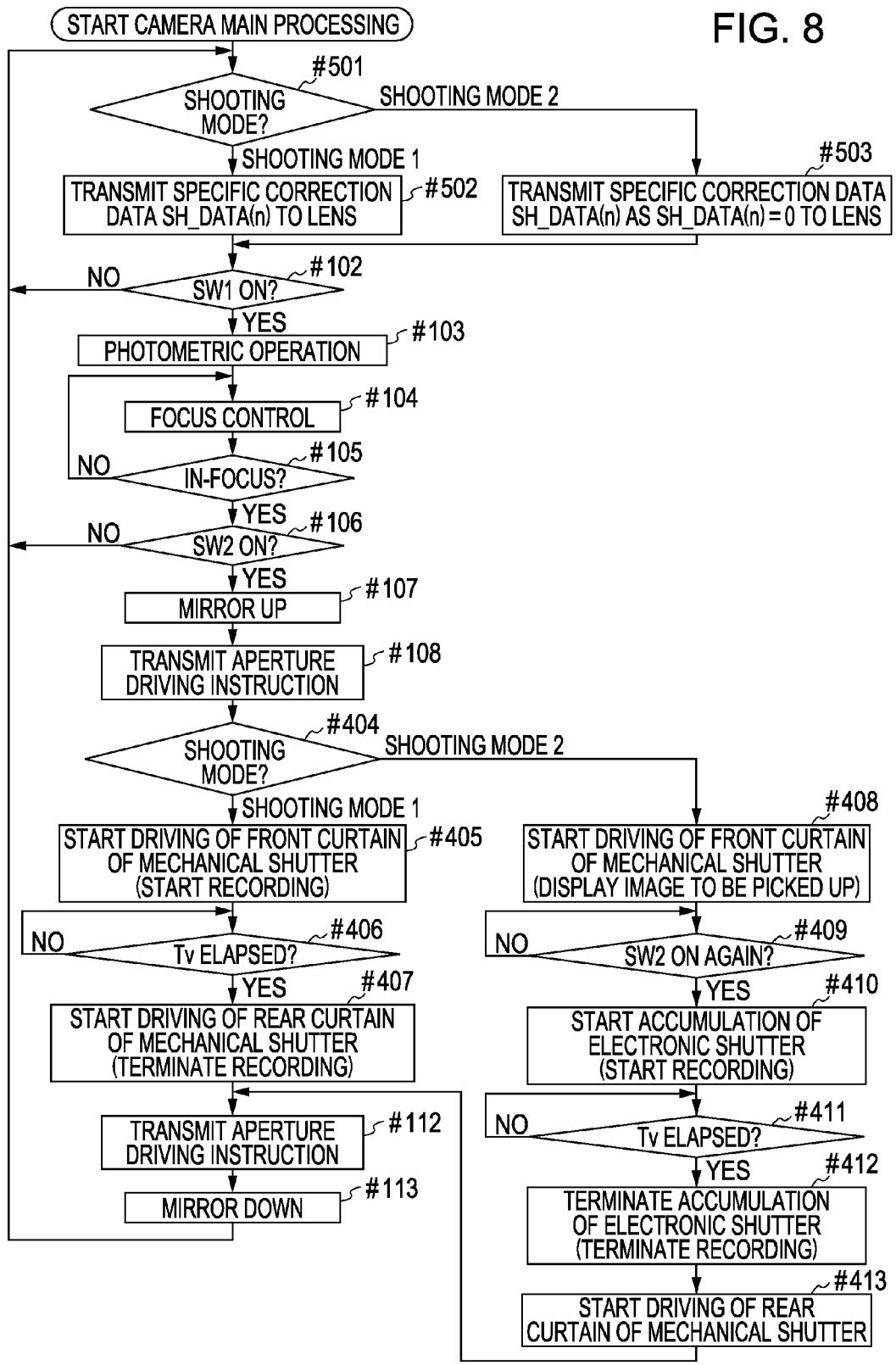
FIG. 8 is a flowchart showing an exemplary main operation of a camera CPU according to a third embodiment of the present invention.

Note that only steps #501 to #503 shown in FIG. 8 are described, since these steps are applicable to the third embodiment of the present invention. Since other operations are similar as that shown in FIG. 7, the same numbers are applied to such steps, and the description thereof will be omitted.

In step #501, the shooting mode is determined. If shooting mode 1 is selected (using the mechanical shutter 104), the operation proceeds to step #502. In this step, the specific correction data stored in the ROM (not shown) for correcting the shake due to the drive of the shutter front curtain in the interchangeable lens 200 is transmitted to the interchangeable lens 200.

On the other hand, if shooting mode 2 is selected (using the electronic shutter), the operation proceeds to step #503, in which the above-mentioned specific correction data is determined to be 0, and it is transmitted to the interchangeable lens 200.

Figure 9:
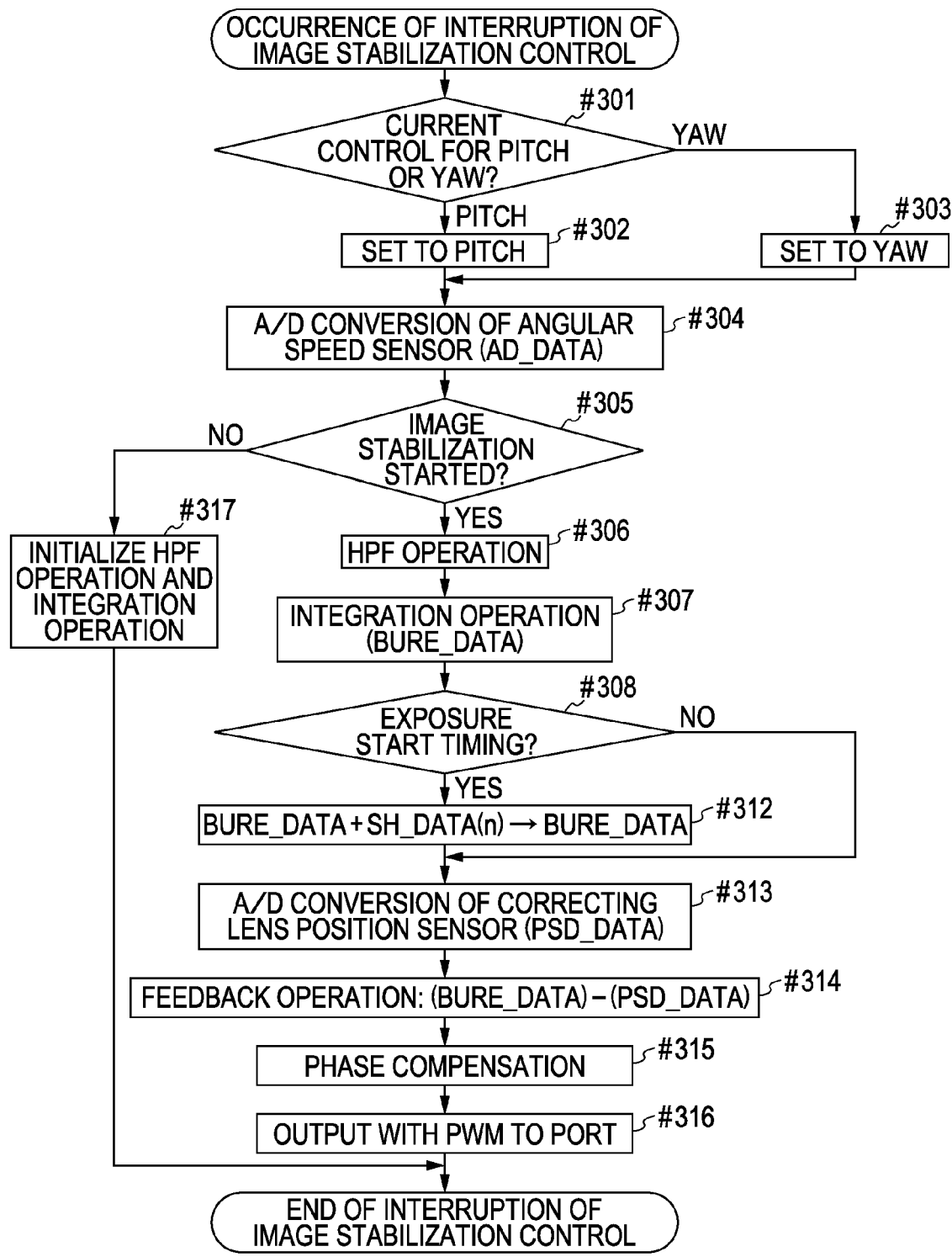
FIG. 9 is a flowchart showing an exemplary interruption operation of image stabilization of a lens CPU according to the third embodiment of the present invention.
Figure 10:
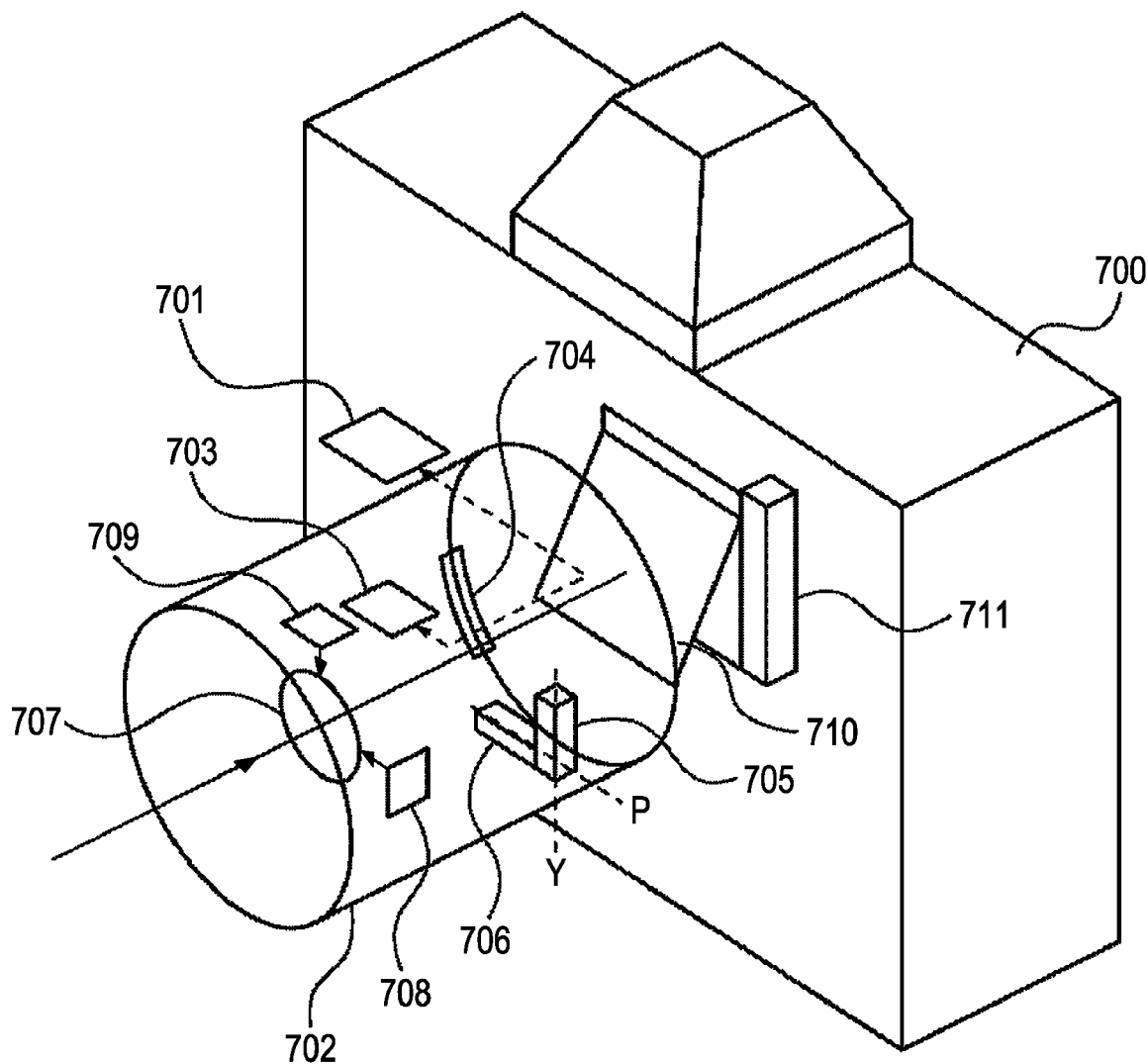
FIG. 10 is a schematic illustration showing an example of a conventional camera system having an image stabilization system provided in an interchangeable lens.
Figure 11:
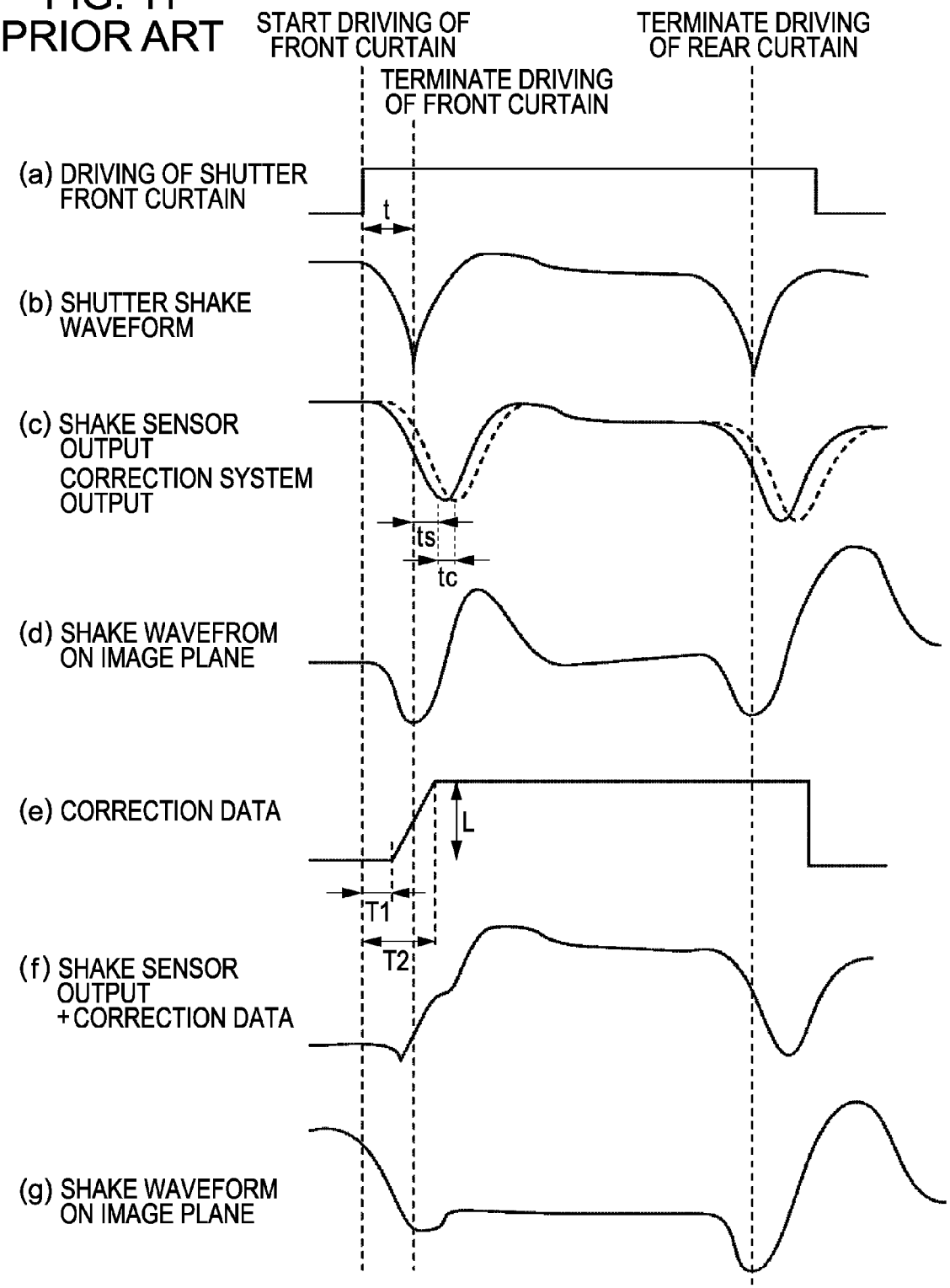
FIG. 11 is an explanatory view showing shake waveforms accompanied by drive of a focal plane shutter which is used in a normal single-lens reflex camera.

Next, the interruption operation of the image stabilization by the lens CPU 208, which is different from that described in the first and second embodiments, will be described below with reference to the flowchart shown in FIG. 9.

The operation in the third embodiment of the present invention is similar to that according to the flowchart shown in FIG. 5 with the steps #309 to #311 deleted. Accordingly, the detailed description will be omitted.

Note that in the step #312, the specific correction data SH_DATA(n) may be the one transmitted from the camera body 100. Therefore, the specific correction data is modified depending on the shooting mode, and when the electronic shutter is used, the shake due to the drive of the shutter front curtain would not be substantially corrected.

As described above, the camera body 100 modifies the specific correction data to be used for correcting the shake due to the drive of the shutter front curtain in the interchangeable lens 200, and transmits the modified data to the interchangeable lens 200.

In the combination of the camera body 100 and the interchangeable lens 200 in which either one of the mechanical shutter 104 and the electronic shutter is selected depending on the shooting mode in the single camera, the operation for correcting the shake due to the drive of the shutter front curtain may not be substantially performed depending on the shooting mode, without changing the conventional operation of the interchangeable lens 200.

Therefore, erroneous correction would not be performed. Thus, any increase in the image blur due to the erroneous correction may be prevented.

While the embodiments each have the front curtain of the mechanical shutter 104, the front curtain may be eliminated in the case of using the electronic shutter, and the operation of the front curtain may be performed by the electronic shutter. Alternatively, only the electronic shutter may be provided without the provision of the mechanical shutter 104.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-034967 filed Feb. 13, 2006, which is hereby incorporated by reference herein in its entirety.

What is claimed:

1. A camera system including a camera body and an interchangeable lens detachably attached to the camera body and adapted to communicate with the camera body, the camera system comprising:
   an image pickup switch configured to give an instruction to start picking up an image;
   a shutter unit configured to determine the picking-up time of the image to be picked up, the shutter unit having a mechanical shutter and an electronic shutter;
   a picking-up mode switch configured to select one of a first picking-up mode in which the start of the picking-up time is determined by the mechanical shutter and a second picking-up mode in which the start of the picking-up time is determined by the electronic shutter;
   a shake detector configured to detect a shake component of the camera system;
   a storage unit configured to store data relating to a shake by an operation of the shutter unit;
   a calculation unit configured to calculate a shake amount on the basis of the shake component detected by the shake detector and the data stored in the storage unit corresponding to an operation of the image pickup switch; and
   a correction unit configured to correct image blur due to the shake component
   wherein the storage unit stores the data for each picking-up mode.

2. The camera system according to claim 1, wherein the storage unit is provided in the interchangeable lens, and the data relating to the shake by the operation of the shutter unit in the selected picking-up mode is used by the calculation unit in accordance with information related to the selected picking-up mode transmitted from the camera body.

3. The camera system according to claim 1, wherein the storage unit is provided in the camera body, and the camera body is configured to transmit the data relating to the shake by an operation of the shutter unit in the selected picking-up mode stored in the storage unit to the interchangeable lens.

4. The camera system according to claim 1, wherein the data stored in the storage unit includes data that the shake by the operation of the shutter unit is assumed to be 0 when the second picking-up mode is selected.

5. The camera system according to claim 1, wherein the mechanical shutter is a focal plane shutter.

6. The camera system according to claim 1, wherein both of the first and second picking-up modes are the modes for picking up the image.

7. A camera body to which a lens unit can be interchangeably attached, the lens unit having a shake detector configured to detect a shake component, a correction unit configured to correct image blur due to the shake component, a calculation unit configured to calculate a shake amount on the basis of the shake component detected by the shake detector, the camera body comprising:
   an image pickup device configured to pick up an image to be picked up;
   a shutter unit configured to determine the picking-up time of the image to be picked up, the shutter unit having a mechanical shutter and an electronic shutter;
   a picking-up mode switch configured to select one of a first picking-up mode in which the start of the picking-up time is determined by the mechanical shutter and a second picking-up mode in which the start of the picking-up time is determined by the electronic shutter;
   an image pickup switch configured to give an instruction to start picking up the image;

a storage unit configured to store data relating to a shake by an operation of the shutter unit; and a communication unit configured to send to the lens unit the data stored in the storage unit to calculate a shake amount by the calculation unit in the lens unit, in response to the instruction given by the image pick up switch wherein the storage unit stores the data for each picking-up mode.

8. The camera system according to claim 7, wherein the mechanical shutter is a focal plane shutter.

9. The camera system according to claim 7, wherein both of the first and second picking-up modes are the modes for picking up the image.

10. The camera system according to claim 7, wherein the storage unit is provided in the interchangeable lens, and the data relating to the shake by the operation of the shutter unit in the selected picking-up mode is used by the calculation unit in accordance with information related to the selected picking-up mode transmitted from the camera body.

11. The camera system according to claim 9, wherein the storage unit is provided in the camera body, and the camera body is configured to transmit the data relating to the shake by an operation of the shutter unit in the selected picking-up mode stored in the storage unit to the interchangeable lens.

12. The camera system according to claim 7, the data stored in the storage unit includes data that the shake by the operation of the shutter unit is assumed to be 0 when the second picking-up mode is selected.

* * * * *